United States Patent [19]
Brendamour

[11] 4,283,153
[45] Aug. 11, 1981

[54] COMPLIANT APPARATUS WITH REMOTE SMEARED CENTERS

[75] Inventor: David A. Brendamour, Cincinnati, Ohio

[73] Assignee: Cincinnati Milacron Inc., Cincinnati, Ohio

[21] Appl. No.: 971,850

[22] Filed: Dec. 21, 1978

[51] Int. Cl.³ .............................................. G01B 5/25
[52] U.S. Cl. .................................. 403/53; 33/169 C; 33/185 R; 33/189
[58] Field of Search ............ 33/169 C, 172 D, 185 R, 33/189, 174 Q, 174 L, 191; 403/27, 24, 410, 53

[56] References Cited
U.S. PATENT DOCUMENTS

| 4,098,001 | 7/1978 | Watson | 33/185 R |
| 4,155,169 | 5/1979 | Drake et al. | 33/185 R |
| 4,202,107 | 5/1980 | Watson | 33/169 C |

Primary Examiner—William D. Martin, Jr.
Attorney, Agent, or Firm—Thomas M. Farrell

[57] ABSTRACT

An apparatus, particularly suitable for automated assembly, has two uncoupled rotational degrees of movement about two non-coincident remote centers. The apparatus has a resulting pivot point which is "smeared" between the two remote centers.

5 Claims, 9 Drawing Figures

COMPLIANT APPARATUS WITH REMOTE SMEARED CENTERS

BACKGROUND

The present invention relates to mechanical compliance systems and more particularly to an improved remote center compliance apparatus which is highly useful in the field of automated assembly.

Since the advent of automatic manufacturing systems, interest has existed in automatizing the assembly of parts. For the most part, problems associated with the assembly of close-fitting parts have prevented wide-scale extensions of the current trend toward automated manufacturing from extending into the area of assembly.

One problem which frequently arises in the assembly of close-fitting parts, where the collective tolerances of the parts in assembly equipment exceeds the assembly clearance, is "jamming". Part "jamming" occurs in assembly because a part is not pushed perfectly into its proper location. Once a slight "jam" occurs, pressure applied to the top of the part being located (at the grouping location) most frequently results in even further "jamming". This further "jamming" occurs because the part tends to rotate about the point where pressure is applied.

In the past, attempts have been made to solve the problems of close-fitting assembly with elaborate force feedback electronics sensing devices. In addition to cost considerations, these devices frequently generated ambiguous signals in "jamming" situations, and the resulting correction force did not always free the "jam".

Many of the problems resulting from "jamming" have been ameliorated by mechanical compliance as in the prior art. The most successful of these systems creates a virtual rotational center at or beyond the assembly parts interface. The effect of creating a virtual rotational center at this remote location is similar to the effect of pulling the assembly parts together from the virtual center. This effect is, however, generated by pushing the part on the opposite side of the assembly interface. By effectively moving the rotation center to a point near or beyond the assembly interface, continued pressure applied at the opposite side of the assembly interface will tend to align the parts and alleviate the "jamming".

While effectively pulling parts together results in substantially fewer "jams" than pushing, pulling alone will not eliminate "jamming" problems. One notoriously common example of a "jam" which results from pulling is a drawer which "jams" when pulled from a chest of drawers. The prior art remote center compliance systems have attempted to further correct the small number of pulling type "jams" by superimposing a translational compliance system onto the rotary compliance system created by the remote center. The result has been partially successful in that it does alleviate many pulling type "jams". The translational compliance provides a second uncoupled independent freedom which eliminates the pulling type "jam".

This solution has not been totally successful. The translational compliance makes horizontal assembly most difficult. The mechanical translational compliance apparatus cannot distinquish between gravity and assembly interface forces. Thus, for horizontal assembly applications (as opposed to vertical assembly in which one part is positioned beneath the other), particularly those involving heavy parts or heavy tooling, the prior art remote center compliance systems have become unworkable.

The present invention alleviates many of the problems of existing remote center compliance systems and is particularly advantageous in horizontal assembly applications. The present invention provides two independent freedoms of movement with the remote center "smeared" between two locations.

SUMMARY OF THE INVENTION

In accordance to the invention, an apparatus with remote rotational centers, particularly suitable as an automated assembly apparatus, includes a base and a first intermediate support member. A first set of rotational supports obliquely extend from the base to the first intermediate support. A second set of rotational supports extend from the first intermediate support to a second intermediate support. Both sets of rotational supports have lines of action along spherical radii of non-coincident spheres. An end-effector is connected to the second intermediate support and is rotatable about a remote "smeared" pivot point which lies between the centers of the non-coincident spheres.

BRIEF DESCRIPTION OF THE DRAWINGS

There will now be given a detailed description point to be read in reference to the coming drawings of an apparatus which is a preferred embodiment of the invention which has been selected to illustrate this invention by way of example.

In the accompanying drawings.

DETAILED DESCRIPTION OF THE PREFERRED EMBODIMENT

Figure 1:
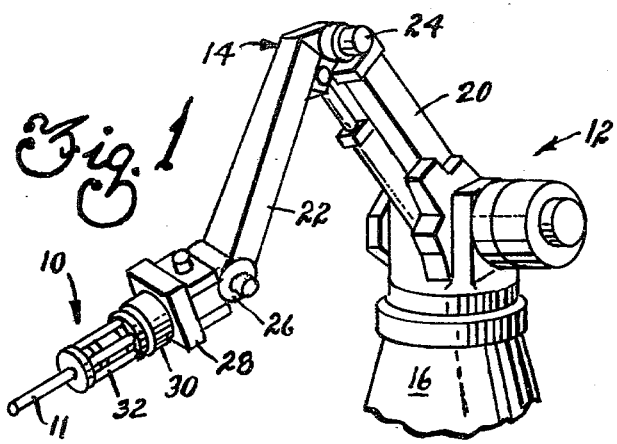
FIG. 1 is an environmental view illustrating the compliant assembly apparatus of the preferred embodiment upon an industrial robot.
Figure 2:
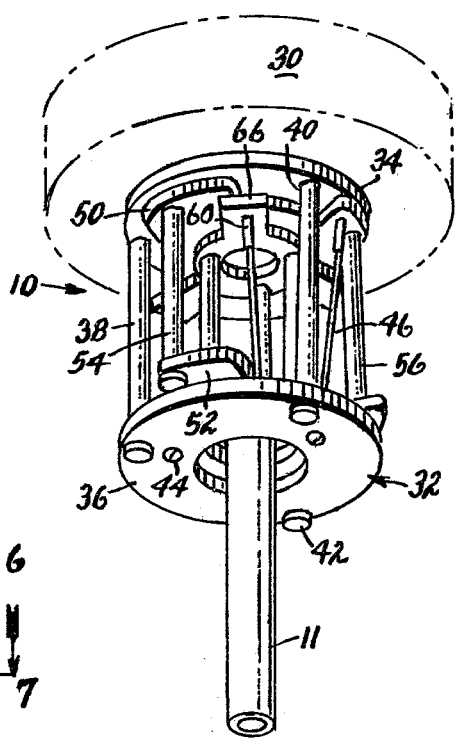
FIG. 2 is an enlarged perspective view of the compliant assembly apparatus of FIG. 1.

Referring now to the drawings and to FIG. 1 in particularly, the preferred embodiment of the compliant apparatus 10 of the present invention is shown mounted upon an industrial robot 12. The robot 12 is of six-axis jointed arm design. It has an arm 14 which is rotatably mounted upon a base. The arm 14 has a shoulder swivel joint 18 which is mounted upon a base 16. The arm 14 includes a forearm section 22 which is rotatably connected to an upper arm section 20 by an elbow extension joint 24. A wrist section 26 with yawl, pitch and roll axes is mounted to the forearm section 22 upon one end and supports a robot mounting plate 28 upon the other end. A mounting plate 30 for the compliant assembly apparatus 10 is mated with the robot mounting plate 28. The assembly mounting plate 30 supports the compliant assembly apparatus 10 which in turn supports an end-effector 11 which for purposes of illustration is shown as a rod. It should be apparent to those skilled in the art, however, that other types of end-effector as for example grippers, could also be used. The robot upon which the compliant assembly apparatus is mounted is a commercially available apparatus and forms no part of the present invention.

The preferred embodiment of the present invention which is mounted to the robot in the environment view of FIG. 1, is depicted in greater detail in FIGS. 2-8. The overall structure of the embodiment is shown most comprehensibly in the perspective view of FIG. 2. A base 32 is rigidly mounted to the assembly mounting plate 30. The base 32 is shown in the form of a cylindrical cage with upper and lower rings 34 and 36 (while the terms upper and lower are used in the description for convenience, the terms have meaning only as applied to the vertical position illustrated in FIG. 2). The ring 34 is secured to the mounting surface and is rigidly joined to the lower ring 36 by three columnar support members 38, 40 and 42 (columnar support member 42 is partially hidden in FIG. 2).

Figure 4:
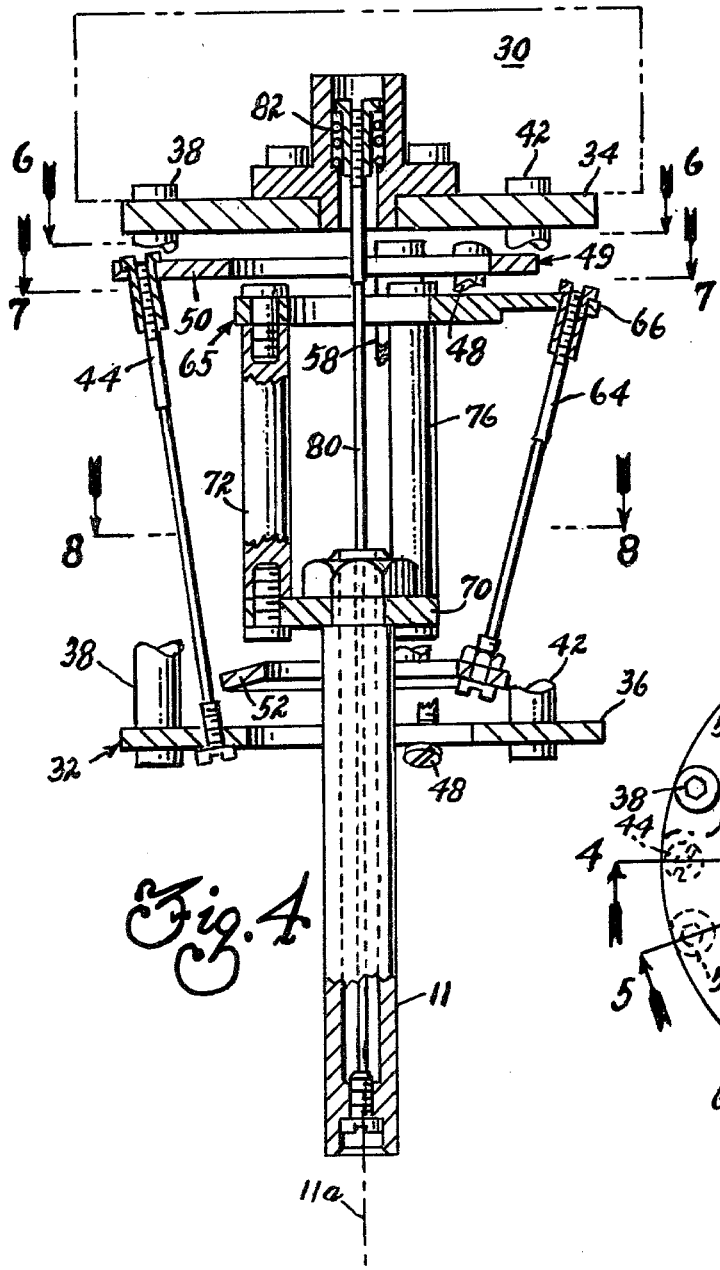
FIG. 4 is a revolved cross-sectional view of the assembly apparatus of FIG. 2 taken in elevation in the direction of section 4—4 in FIG. 3 with many of the details not on the line of the cutting plane removed for clarity.

As partially illustrated in FIG. 4, a first set of three obliquely oriented and rotational supports 44, 46 and 48 (only support 44 and part of 48 are shown in FIG. 4, support 44 is shown in FIGS. 3, 6, 7 and 8) extend from the lower base ring 36 to an upper ring 50 of a first intermediate support structure 49. This first intermediate support structure is comprised of upper and lower ring members 50 and 52 which are joined by a second group of three columnar support members 54, 56 and 58. First intermediate support structure 49 is, like the base cage 32, of cylindrical cage-like configuration. It is smaller than and disposed within the base cage 32.

Figure 8:
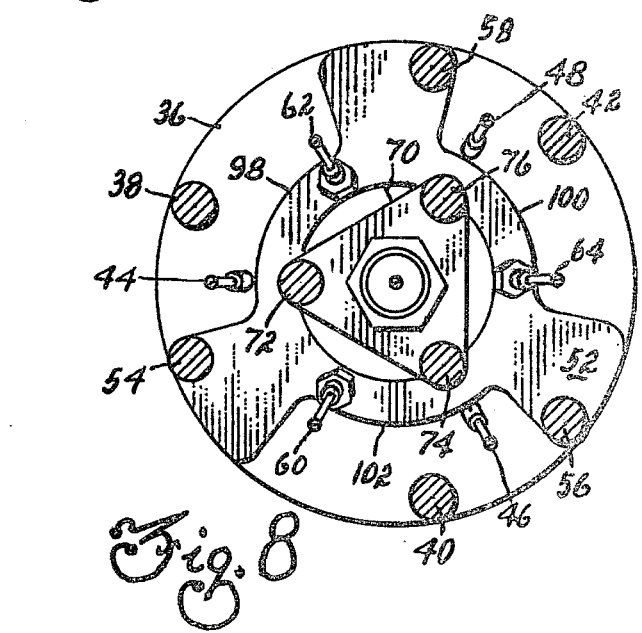
FIG. 8 is a plan view of the apparatus of FIG. 2 taken along line 8—8 in FIG. 4.

A joint viewing of FIGS. 4 and 8 shows a second group of three obliquely oriented rotational support members 60, 62 and 64 extending from lower ring 52 of the first intermediate support structure 49 to an upper ring 66 of a second intermediate support 65. The second intermediate support, similar to base cage 32 and first intermediate support 49, has a configuration resembling a cylindrical cage. The lower plate 70 is, however, triangular in shape. The third group of three columnar supports 72, 74 and 76 join the lower triangular plate 70 to the upper ring 66. The second intermediate support 65 is disposed within the first intermediate support 49.

FIG. 4 also shows the end-effector 11 attached to triangular plate 70. The end-effector 11 extends outwardly through openings in rings 52 and 36 (downwardly in the FIG. 4 illustration). A support shown as rod 80 is connected to the end defector 11 and to the upper ring 34 of base 32 where it is resiliently urged upward by compression spring 82. The rod 80 indirectly communicates the upward biasing force of spring 82 to both the first intermediate support 45 and the second intermediate support 65 and maintains tension upon the two sets of rotational supports 44, 46, 48 and 60, 62, 64.

Figure 3:
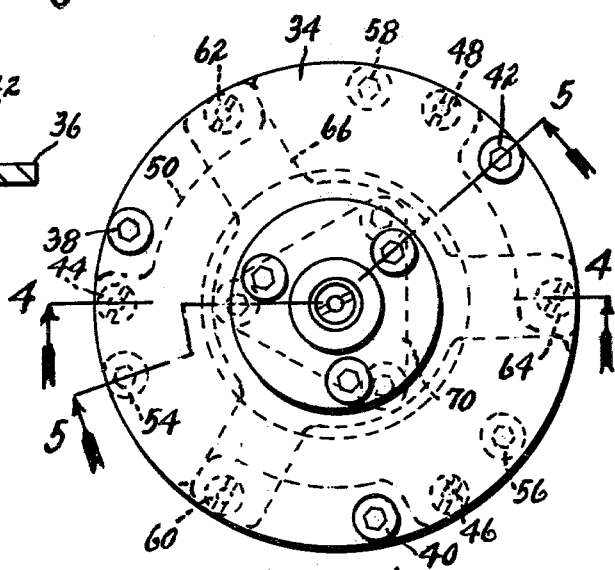
FIG. 3 is a plan view of the assembly apparatus of FIG. 2 with the mounting ring removed for clarity.
Figure 5:
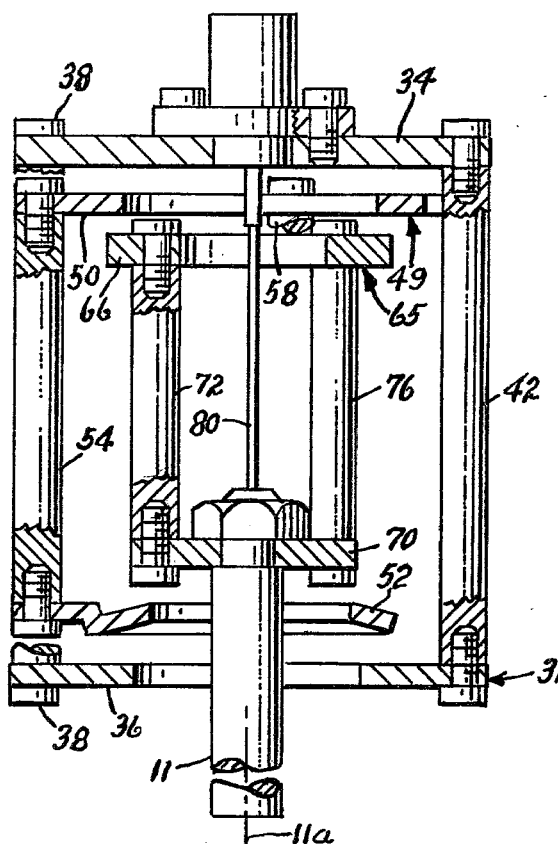
FIG. 5 is a revolved cross-sectional view of the apparatus of FIG. 2 taken in elevation along section 5—5 in FIG. 3 with many of the details not on the line of the cutting plane removed for clarity.
Figure 6:
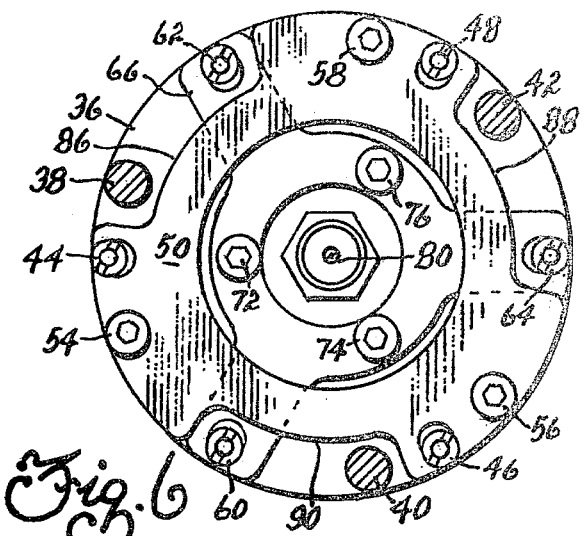
FIG. 6 is a plan view of the apparatus of FIG. 2 taken along line 6—6 of FIG. 4.
Figure 7:
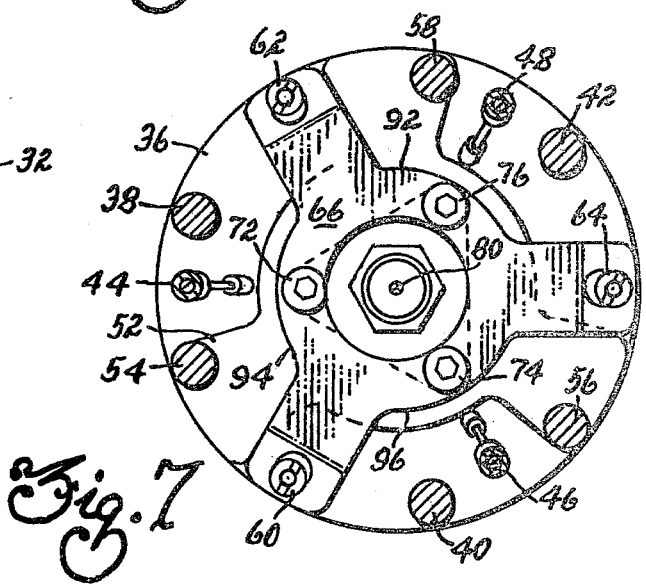
FIG. 7 is a plan view of the apparatus of FIG. 2 taken along line 7—7 in FIG. 4.

FIG. 3 is a plan view of the embodiment described above illustrating the upper base ring 34 in solid lines. It shows the first group of columnar support members 38, 40, 42 are 120° apart and equi-distance from a center line 11a (see FIG. 4) running through the end effector 11. FIG. 6 shows the second group of columnar members 54, 56 and 58 are likewise separated by 120° in equi-distance from the center line 11a. The upper ring 50 of the first intermediate support structure 49 has three cut-away circumferential sectors 86, 88 and 90 to avoid interference with the three columnar support members 38, 40 and 42. Similarly, the upper ring 66 of the second intermediate support 65 has three cut-away circumferential sectors 92, 94 and 96 to avoid interference with both groups of columnar support members 54, 56, 58 and 38, 40, 42, and the set of rotational supports 44, 46, 48 as shown in FIG. 7. FIG. 8 shows three more cut-away circumferential sectors 98, 100, 102 which avoid interference with columnar supports 38, 40 and 42 as well as the first set of rotational supports 44, 46 and 48.

Figure 9:
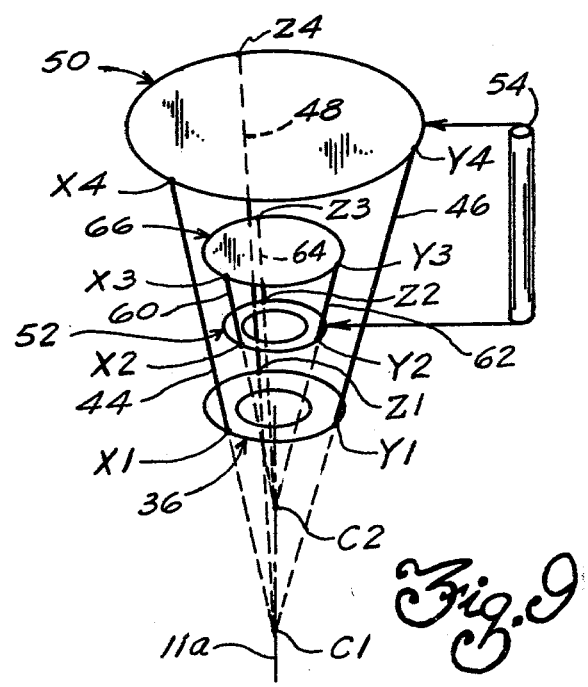
FIG. 9 is a diagrammatic depiction of two sets of rotational support members of the apparatus illustrated in FIG. 2 illustrating the geometric relationship therebetween.

Each of the sets of rotational supports have lines of action (defining the directions forces are transmitted) which lie along spherical radii of separate remote spheres. This may be appreciated by viewing the diagrammatic three-dimensional illustration of FIG. 9 which depicts each member of the two sets of rotational members 44, 46, 48 and 60, 62, 64 as lines with corresponding members. In FIG. 9, the plane defined by the points X1, Y1 and Z1 represents the lower ring 36 of the base 32; the plane defined by points X2, Y2 and Z2 represent the lower ring 52 of the first intermediate support structure 49; the plane defined by points X3, Y3 and Z3 represents the upper ring 66 of the second intermediate support 65; and the plane defined by points X4, Y4, Z4 represents the upper ring 50 of the first intermediate support structure 49. The rotational supports 44, 46 and 48 extend from points X4, Y4 and Z4 to points X1, Y1, and Z1 respectively; and the rotational supports 60, 62 and 64 extend from points X3, Y3 and Z3 to points X2, Y2 and Z2, respectively. As illustrated in the diagrammatic depiction, rotational supports 44, 46 and 48 lie along spherical radii of a first sphere having a center C1. The second set of rotational supports 60, 62 and 64 convergently approach the end effector center line 11a more rapidly than the first set and lie along spherical radii of a second sphere having a center C2.

Each of the two sets of rotational supports creates a divergent center for rotation remote from the apparatus. The first set 44, 46 and 48 creating a point C1 and the second set 60, 62 and 64 creating a virtual center at a point C2. When a side force is applied against the end-effector 11 in operation, such as that resulting from interfacing to assembly parts which are not perfectly aligned, moments ensue about the remote virtual center C1 and C2. Resulting rotation about the two non coincident centers C1, C2 develops a "smeared" pivotal point area between the centers. The rotation about each, however, is independent and the movements are uncoupled fulfilling the necessary requirement to eliminate the pulling type "jam" as mentioned above.

Further, since both of the uncoupled movements are rotational, the apparatus is less compliant to gravity forces when it is used in horizontal assembly, i.e. when one of the assembly parts is not positioned beneath the other. Thus, the apparatus may be used for heavier parts in horizontal assembly, greatly enhancing the apparatus' flexibility.

Although the present invention has been described in conjunction with the preferred embodiments, it is to be understood that modifications, variations, may be resorted to without departing from the spirit of the invention as those skilled in the art will readily understand. For example, rotational supports may be ball bearings with lines of action residing along spherical radii of a remote sphere. Since the modifications and variations are considered to be within the view and scope of the present invention as defined by the appended claims.

What is claimed is:

1. An apparatus with remote multiple rotational centers, comprising:
    (a) a base;
    (b) a first intermediate support member;
    (c) a first set of rotational supports obliquely extending from said base to said intermediate support member, each of said rotational supports in said first set having lines of action along spherical radii on a first sphere having a first remote center;
    (d) a second intermediate support member;
    (e) a second set of rotational supports obliquely extending from said first intermediate support member to said second intermediate support member, each of said rotational supports in said second set having lines of action along spherical radii of a second sphere having a second remote center noncoincident with said first remote center; and
    (f) an end-effector connected to said second intermediate support member, said end-effector being rotatable about a remote pivot point which lies between said first and said second centers.

2. An apparatus as recited in claim 1 wherein said second intermediate support member is disposed in said first intermediate support member.

3. An apparatus as recited in claim 1 wherein said first and second sets of rotational supports are of columnar configuration.

4. An apparatus as recited in claim 3 wherein each of the rotational supports in said first set are oriented with respect to the base at an angle which is approximately the same.

5. An apparatus as recited in claim 4 wherein each of the rotation supports in said second set are oriented to the base at an angle which is approximately the same.

* * * * *